United States Patent
Evans et al.

(10) Patent No.: US 11,946,503 B2
(45) Date of Patent: Apr. 2, 2024

(54) REINFORCED HINGED CONNECTOR

(71) Applicant: Simpson Strong-Tie Company Inc., Pleasanton, CA (US)

(72) Inventors: Thomas G. Evans, Dublin, CA (US); Dustin P. Muhn, San Francisco, CA (US); Rachel Marie Holland, San Ramon, CA (US); Benedict Ang, Dublin, CA (US); Paul Howard Oellerich, Pleasanton, CA (US); James M. Benton, Tracy, CA (US); Timothy Patrick Murphy, Tracy, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 74 days.

(21) Appl. No.: 16/742,779

(22) Filed: Jan. 14, 2020

(65) Prior Publication Data

US 2020/0224688 A1    Jul. 16, 2020

Related U.S. Application Data

(60) Provisional application No. 62/791,891, filed on Jan. 14, 2019.

(51) Int. Cl.
  *F16B 5/00* (2006.01)
  *F16B 9/00* (2006.01)

(52) U.S. Cl.
  CPC ............ *F16B 5/0056* (2013.01); *F16B 9/052* (2018.08)

(58) Field of Classification Search
  CPC .. F16B 9/05; F16B 9/052; F16B 9/058; F16B 5/0056; F16B 2200/503; E04B 1/2612; E04B 2001/2616; E04B 1/2608; E04B 2001/2644
  See application file for complete search history.

(56) References Cited

U.S. PATENT DOCUMENTS

| 508,280 A | 11/1893 | Cavaliaro |
| 783,807 A * | 2/1905 | Tuteur ................. E04B 1/2612 403/232.1 |
| 2,911,690 A | 11/1959 | Sanford |

(Continued)

FOREIGN PATENT DOCUMENTS

| DE | 10036754 | 6/2002 |
| EP | 357 273 A1 | 3/1990 |

(Continued)

OTHER PUBLICATIONS

Simpson Strong-Tie Company, Inc., W/WNP/HW Options, Catalog, 1991, pp. 33, 35, 37, 40 and 41 (5 pages), Simpson Strong-Tie Company, Inc., Pleasanton, CA.

(Continued)

*Primary Examiner* — Matthew R McMahon
(74) *Attorney, Agent, or Firm* — Charles R. Cypher (57) ABSTRACT

A connector is provided to attach a supported member to a supporting member, with the supported member being in sloped and skewed relation to the supporting member. The connector has back members attached to side members. A seat member attaches to the side members through a hinged connection. The seat member interfaces with the bottom face of the supported member and can be disposed at a sloped angle. A pair of seat side members extend from the seat member.

10 Claims, 13 Drawing Sheets

(56) References Cited

U.S. PATENT DOCUMENTS

| | | | |
|---|---|---|---|
| 2,990,590 A | | 7/1961 | Graveley |
| 3,036,347 A | | 5/1962 | Findleton |
| 3,333,875 A | | 8/1967 | Tracy |
| 3,596,941 A | | 8/1971 | Tracy |
| 3,601,428 A | | 8/1971 | Gilb |
| 3,749,428 A | | 7/1973 | Hustead |
| 3,823,522 A | | 7/1974 | Jureit et al. |
| 4,005,942 A | * | 2/1977 | Gilb .............. E04B 1/2612 403/189 |
| 4,144,683 A | | 3/1979 | Dean |
| 4,230,416 A | * | 10/1980 | Gilb .............. F16B 9/052 248/300 |
| 4,261,155 A | * | 4/1981 | Gilb .............. E04B 1/2612 248/282.1 |
| 4,381,635 A | * | 5/1983 | Solo .............. E04B 1/2608 52/639 |
| 4,411,548 A | * | 10/1983 | Tschan .............. F16B 9/052 52/289 |
| 4,423,977 A | * | 1/1984 | Gilb .............. E04B 1/2608 403/232.1 |
| 4,480,941 A | | 11/1984 | Gilb et al. |
| 4,560,301 A | * | 12/1985 | Gilb .............. F16B 9/052 403/3 |
| 4,817,359 A | | 4/1989 | Colonias |
| 4,841,690 A | | 6/1989 | Commins |
| 4,890,436 A | | 1/1990 | Colonias |
| 4,893,961 A | * | 1/1990 | O'Sullivan .............. E04B 5/12 403/231 |
| 4,897,979 A | * | 2/1990 | Colonias .............. F16B 9/058 248/248 |
| 5,004,369 A | * | 4/1991 | Young .............. E04B 1/2612 403/232.1 |
| 5,042,217 A | | 8/1991 | Bugbee et al. |
| 5,054,755 A | | 10/1991 | Hawkes |
| 5,071,280 A | | 12/1991 | Turner |
| 5,094,059 A | | 3/1992 | Ganescu |
| 5,111,632 A | * | 5/1992 | Turner .............. E04B 1/2612 52/703 |
| 5,190,268 A | | 3/1993 | Espinueva |
| 5,217,317 A | | 6/1993 | Young |
| 5,220,766 A | | 6/1993 | Hills, Sr. |
| 5,240,342 A | | 8/1993 | Kresa, Jr. |
| 5,253,465 A | | 10/1993 | Gilb |
| 5,274,981 A | | 1/1994 | Commins |
| 5,303,520 A | | 4/1994 | Gozdziak |
| 5,341,619 A | | 8/1994 | Dunagan |
| 5,380,116 A | | 1/1995 | Colonias |
| 5,457,928 A | * | 10/1995 | Sahnazarian ......... E04B 1/2612 52/696 |
| 5,553,961 A | | 9/1996 | Olden |
| 5,555,694 A | * | 9/1996 | Commins .............. F16B 9/052 248/300 |
| 5,564,248 A | * | 10/1996 | Callies .............. F16B 9/052 52/715 |
| 5,598,680 A | * | 2/1997 | Wilhelmi .............. E04B 1/2608 403/231 |
| 5,603,580 A | * | 2/1997 | Leek .............. F16B 9/052 403/232.1 |
| 5,660,012 A | * | 8/1997 | Knudson .............. B21D 39/034 52/656.1 |
| 5,720,571 A | * | 2/1998 | Frobosilo .............. E04B 2/96 403/231 |
| 5,778,625 A | | 7/1998 | Druffel et al. |
| 5,797,694 A | * | 8/1998 | Breivik .............. E04B 1/2608 403/231 |
| 6,079,176 A | | 6/2000 | Westra et al. |
| 6,123,745 A | | 9/2000 | Hess, III et al. |
| 6,230,466 B1 | | 5/2001 | Pryor |
| 6,401,422 B1 | | 6/2002 | Olden |
| 6,523,321 B1 | * | 2/2003 | Leek .............. E04B 1/2612 52/289 |
| 7,334,372 B2 | * | 2/2008 | Evans .............. E04B 5/12 52/289 |
| 7,343,712 B2 | | 3/2008 | Shelton |
| 7,367,168 B2 | | 5/2008 | Lin |
| 7,503,148 B2 | * | 3/2009 | Lin .............. E04B 1/2608 248/300 |
| 7,716,877 B2 | | 5/2010 | Gilstrap et al. |
| 7,891,144 B2 | | 2/2011 | Gilstrap et al. |
| 7,913,472 B2 | | 3/2011 | Troth et al. |
| 7,971,409 B2 | | 7/2011 | Bak et al. |
| 8,245,479 B2 | | 8/2012 | Gannon |
| 8,250,827 B2 | | 8/2012 | Lin |
| 8,387,333 B2 | | 3/2013 | Brekke |
| 8,443,569 B2 | | 5/2013 | Sias |
| 8,555,592 B2 | * | 10/2013 | Daudet .............. E04B 1/2403 52/489.1 |
| 8,615,942 B2 | | 12/2013 | Lafreniere |
| 8,720,155 B1 | | 5/2014 | Robell |
| 8,950,151 B2 | | 2/2015 | Strickland |
| 8,966,857 B2 | | 3/2015 | Pope et al. |
| 9,010,062 B2 | | 4/2015 | Hill |
| 9,045,895 B1 | * | 6/2015 | Lin .............. F16B 7/0486 |
| 9,129,999 B2 | | 9/2015 | Nicholls et al. |
| 9,394,680 B2 | * | 7/2016 | Bundy .............. E04B 1/2612 |
| 9,809,974 B1 | * | 11/2017 | Brekke .............. E04B 1/40 |
| 9,874,008 B2 | * | 1/2018 | Doupe .............. E04B 1/2612 |
| 10,273,678 B2 | * | 4/2019 | Hensen .............. E04B 1/2608 |
| 10,370,842 B2 | * | 8/2019 | Wesney .............. E04B 1/2612 |
| 11,021,867 B2 | | 6/2021 | Brekke et al. |
| 11,098,478 B2 | * | 8/2021 | Downs .............. E04B 1/2608 |
| 11,131,088 B2 | | 9/2021 | Benton et al. |
| 2004/0206031 A1 | | 10/2004 | Mow |
| 2006/0185311 A1 | | 8/2006 | Attalla et al. |
| 2006/0191233 A1 | | 8/2006 | Tamlyn |
| 2007/0292204 A1 | * | 12/2007 | Hackney .............. E04B 1/10 403/93 |
| 2008/0101855 A1 | | 5/2008 | Lin |
| 2008/0163568 A1 | | 7/2008 | Shelton |
| 2008/0237421 A1 | | 10/2008 | Szpotowski |
| 2008/0277551 A1 | | 11/2008 | Hackney |
| 2009/0113839 A1 | | 5/2009 | Carr |
| 2010/0011697 A1 | * | 1/2010 | Nguyen .............. E04B 7/045 52/714 |
| 2010/0043341 A1 | | 2/2010 | Staley |

FOREIGN PATENT DOCUMENTS

| | | |
|---|---|---|
| GB | 185694 | 9/1922 |
| GB | 2163788 | 3/1986 |
| GB | 2399109 | 1/2005 |
| WO | WO 2001/006068 | 1/2001 |
| WO | WO 2002/057557 | 7/2002 |
| WO | WO 2008/007325 | 1/2008 |

OTHER PUBLICATIONS

Simpson Strong-Tie Company, Inc., Solid Sawn Joist Hangers, LRU Rafter Hanger, Wood Construction Connectors 2013-2014, 2013, p. 83 and Cover Page (2 pages), C-2013, Simpson Strong-Tie Company, inc., Pleasanton, CA.

Simpson Strong-Tie Company, Inc., Plated Truss Connectors, THASR/L Adjustable/Skewable Truss Hangers, Wood Construction Connectors 2011-2012, 2011, pp. 137-138 and Cover Page (3 pages), C-2011, Simpson Strong- Tie Company, Inc., Pleasanton, CA.

Southeastern Metals Manufacturing Co., Inc., Skewed Truss Hanger, Tite Angle Skewed Hanger, Catalog, 1992, p. 8 (1 page), Southeastern Metals Manufacturing Co., Inc., Jacksonville, FL.

Simpson Strong-Tie Company Inc., Solid Sawn Joist Hangers—LRUZ Rafter Hanger, Wood Construction Connectors 2015, Dec. 2014, pp. 92 and 93 (2 pages), C-C-2015, Simpson Strong-Tie Company, Inc., Pleasanton, CA.

Bulldog, Simpson GmbH, Statische Berechnungen Teil 2-BOZETT-Balken-Z-Profile, May 1998, 16 pages, BS 292 5.98, Bulldog Simpson GmbH, Germany.

Southeastern Metals Manufacturing Co., Inc., Construction Hardware—Adjustable Rafter Connector, at least as early as 1991, p. 14 and Cover Page and Back Cover, Southeastern Metals Manufacturing Co., Inc., Jacksonville, FL.

(56) References Cited

OTHER PUBLICATIONS

KC Metals Products, Inc., KC Metals—Superspeed Connectors—Connectors and Seismic Ties for Concrete and Wood Construction, Retrofit Connectors—RUH, 1993, pp. 17 and Cover Page, KC Metals Products, Inc., San Jose, CA.

European Patent Office, PCT—Notification of Transmittal of the International Search Report and the Written Opinion of the International Searching Authority—PCT/US2020/013570-2020, 10 pages, European Patent Office, Netherlands.

European Patent Office, PCT—Communication Pursuant to Rules 161(1) and 162 EPC-20706872.7-2021, 3 pages, European Patent Office, Netherlands.

Simpson Strong-Tie Company Inc., Connectors for Wood Construction, Jan. 1, 1992, cover page, p. 33, back page, Catalog C-92H-1, Simpson Strong-Tie Company, Inc., Pleasanton, CA, United States.

Simpson Strong-Tie Company Inc., Wood Construction Connectors 2009-2010, Jan. 1, 2009, cover page, p. 147, back page, Catalog C-2009, Simpson Strong-Tie Company, Inc., Pleasanton, CA, United States.

Simpson Strong-Tie Company Inc., Wood Construction Connectors 2017-2018, Jan. 1, 2017, cover page, p. 142, back page, Catalog C-C-2017, Simpson Strong-Tie Company, Inc., Pleasanton, CA, United States.

Simpson Strong-Tie Company Inc., Wood Construction Connectors 2017-2018, Jan. 1, 2017, cover page, p. 143-145, 231, back page, Catalog C-C-2017, Simpson Strong-Tie Company, Inc., Pleasanton, CA, United States.

\* cited by examiner

REINFORCED HINGED CONNECTOR

BACKGROUND

This invention relates to a connector for joining structural members and the connection made therewith. In particular, the present invention has particular application as a simple, inexpensive hanger for strengthening a connection between a ridge or hip or valley member and a sloping and skewed rafter member or joist.

U.S. Pat. No. 4,230,416, granted in 1980 to Tyrell T. Gilb, teaches a simple hanger for skewed installations. The hanger was not designed for sloped installations, and left and right skew versions of the part had to be made.

U.S. Pat. No. 4,423,977, granted in 1984 to Tyrell T. Gilb, which is hereby incorporated by reference, provides a good background of the history of patented slope and skew connections. In the background section of U.S. Pat. No. 4,423,977, the inventor spent much time discussing the problems with early solutions that required the notching of the sloped rafter or joist members. A typical hanger has a seat member to support the joist and the seat member is typically disposed orthogonally with respect to the attachment face of the support member; that is to say, typically the seat of the hanger juts out horizontally. This is ideal for most floor and wall connections where the joists themselves are disposed horizontally and the bottom of the joist rests on the seat of the hanger. However, in sloped connections the bottom of the sloped rafter or ridge member will typically be disposed at a slope that is not horizontal. For some joists or rafters a typical hanger with a horizontal seat can be an acceptable choice if the joist or rafter can be notched to create a small horizontal face that rests on the seat of the hanger. However, notching the rafter takes time, and some rafters, particularly I-joists, cannot or should only be notched in very limited situations. Thus, inventors have sought to create hangers for sloped connections where the seat of the hanger is disposed at a sloped angle to interface with the base of the rafter or joist. This way the joist or rafter does not have to be notched if the user wants to have interfacing contact between a seat on the hanger and the bottom surface of the rafter or joist.

U.S. Pat. No. 4,423,977 teaches a simple slope and skew hanger that is made from cutting a blank of sheet metal and cold-forming bends in the sheet metal. Some of the bends can be modified on site during final installation by what is known in the art as field bending. Gilb's single-piece, sheet metal hanger accommodates attaching a rafter or a joist member disposed at varying slopes and skew angles with respect to the ridge member. The Gilb hanger of U.S. Pat. No. 4,423,977 could accommodate joists or rafters at varying slopes because the seat member was not directly connected to the side members or jutting tabs that interfaced with the sides of the joist and steadied the joist. The seat member was free to bend to interface with the bottom of the joist set at a variety of angles.

U.S. Pat. No. 5,457,928, granted to George Sahnazarian in 1995, teaches a slope and skew hanger similar to the Gilb hanger of U.S. Pat. No. 4,423,977. Sahnazarian claimed adding ribs to the members that attached the hanger to the ridge member. U.S. Pat. No. 5,797,694, granted to Arne Norris Breivik in 1998, also teaches a slope and skew hanger similar to the Gilb hanger of U.S. Pat. No. 4,423,977. Breivik claimed shaping the members that attached the hanger to the ridge member in a particular manner.

U.S. Pat. No. 7,503,148, granted to Jin-Jie Lin in 2009, teaches a simple hanger that can accommodate multiple members at various skew angles. The Lin hanger can be modified in the field to the skew angles of the joist or joists, because, as with the Gilb hanger, the side members or jutting tabs were not directly attached to the seat member.

The present invention is a connector and a connection made with that connector that like the prior art makes a sloped and skewed connection while providing additional features not found in the prior art.

SUMMARY OF THE INVENTION

The present invention provides a connector that is easy to install. This is in part due to the shape of the back member of the present connector which allows for a strong connector that can use fewer fasteners than similar connectors. The hanger can be adjusted in the field to left and right skewed versions by the installer. The hanger can accommodate skew angles of up to 45 degrees.

The present invention provides a connector that can support a held member with respect to a holding member with the held member being both skewed (at a non-orthogonal angle to the supporting member) and sloped (up or down).

The connector interfaces with the bottom face of the supported member, and extends upwardly along the attachment face of the supporting member where fasteners attach the connector to the supporting member.

Other advantages of the present invention is that the hanger is provided with a hinged seat that can accommodate slopes of up to 45 degrees, and the hanger can be installed after all of the supported rafters have been tacked into place on the support member.

DETAILED DESCRIPTION OF THE INVENTION

Figure 1:
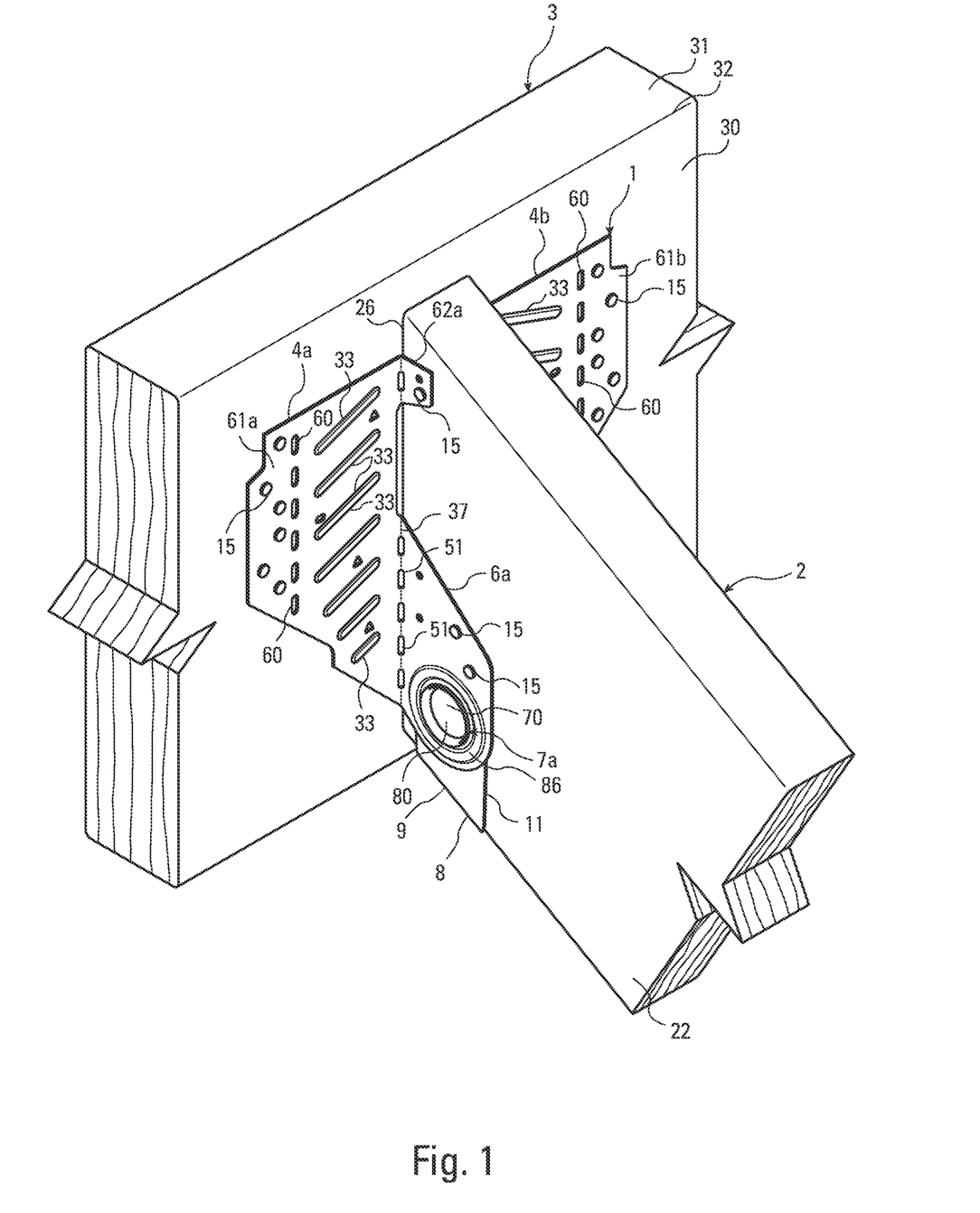
FIG. 1 is a perspective view of the connection of the present invention.
Figure 5:
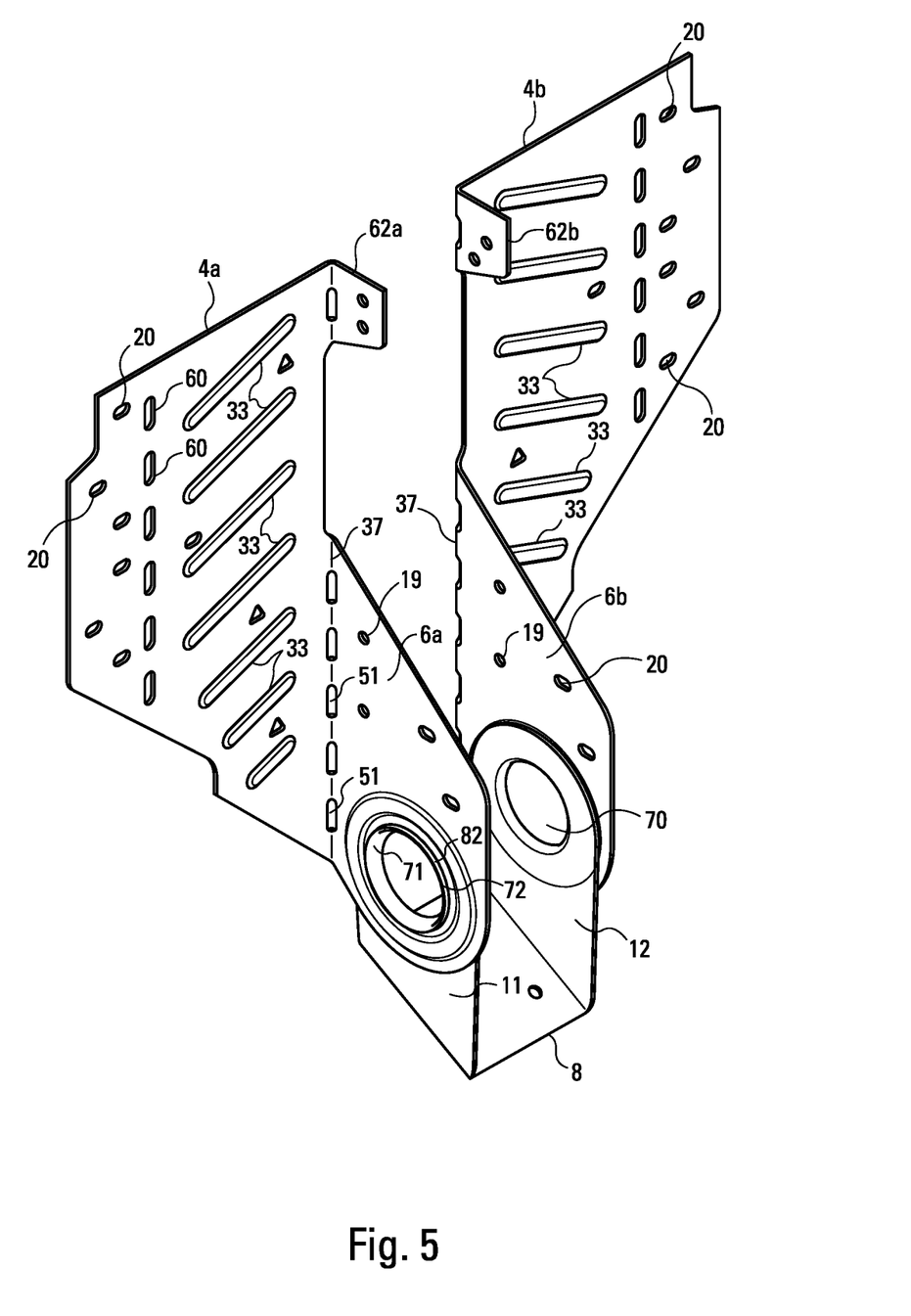
FIG. 5 is a perspective view of the connector shown in FIG. 4.
Figure 6:
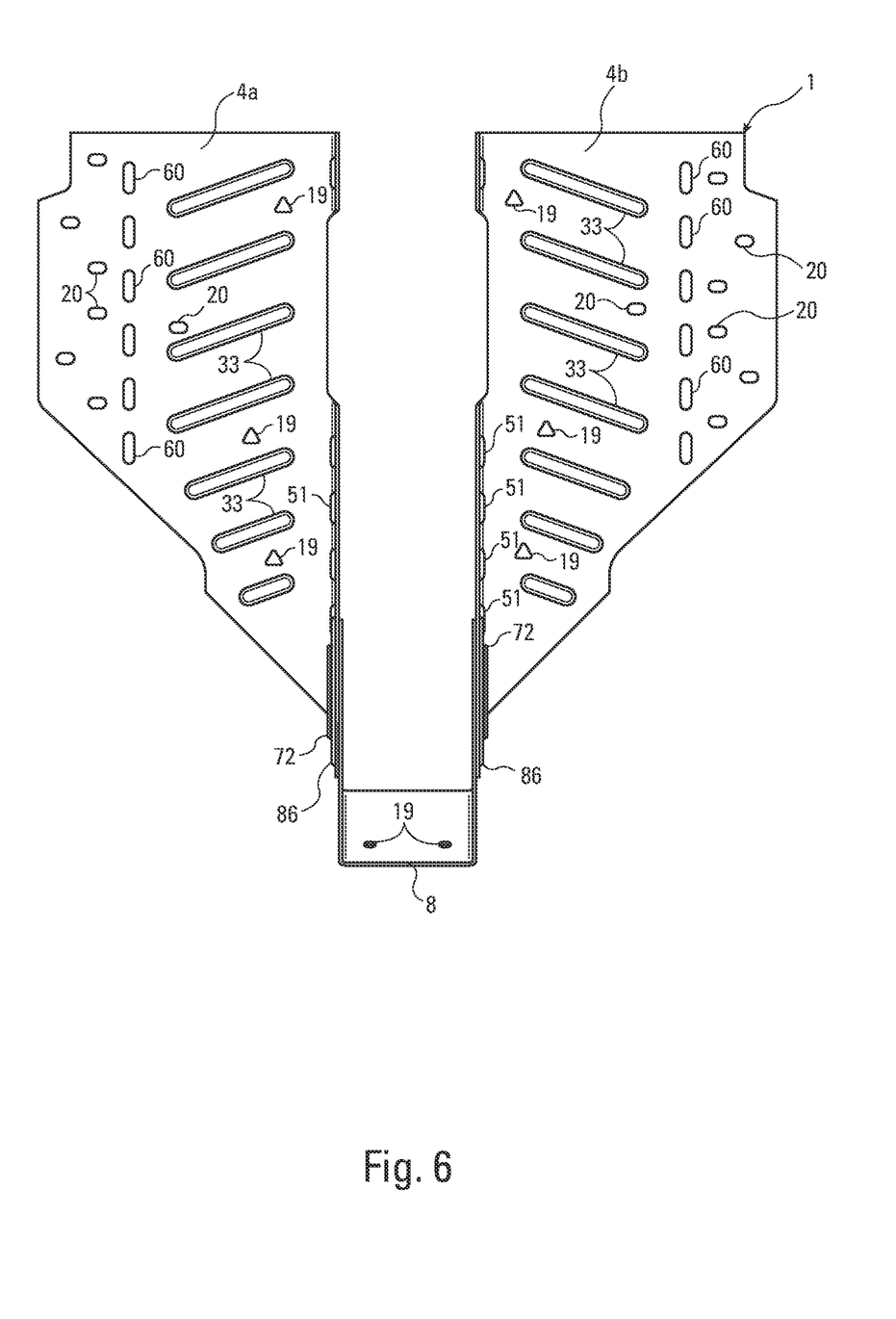
FIG. 6 is a front view of the connector of FIG. 4.
Figure 7:
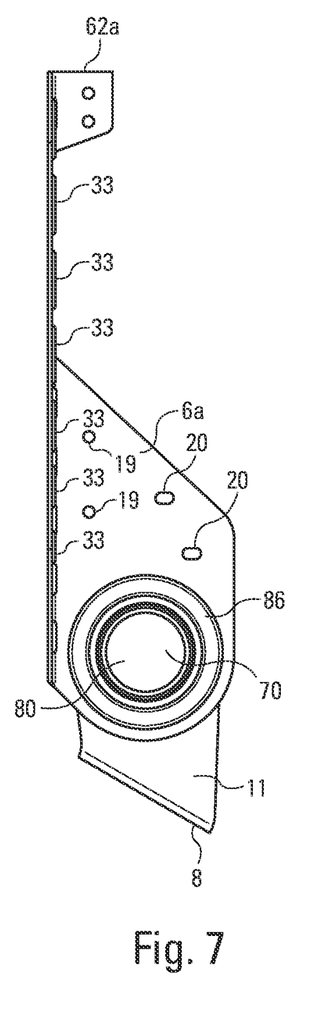
FIG. 7 is a left side view of the connector of FIG. 4.
Figure 8:
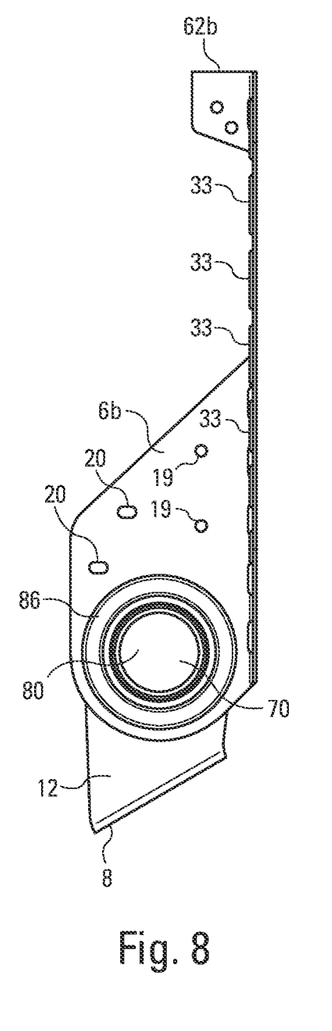
FIG. 8 is right side view of the connector of FIG. 4.
Figure 9:
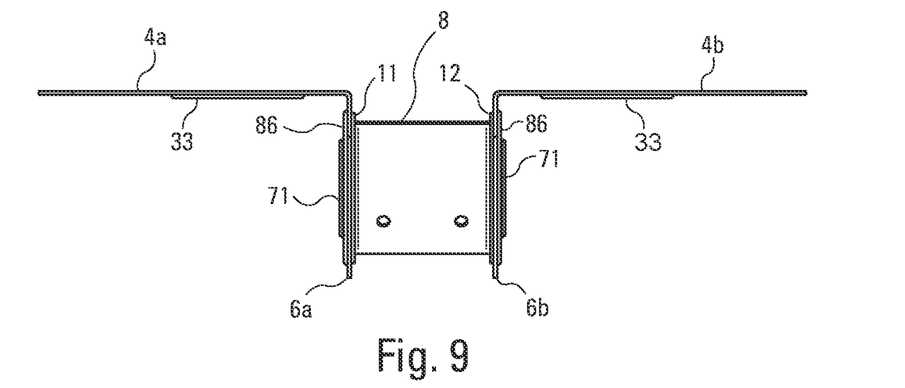
FIG. 9 is a top view of the connector of FIG. 4.
Figure 10:
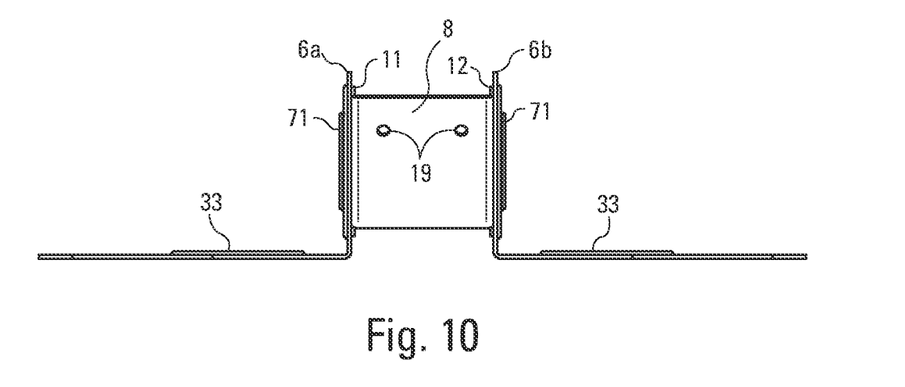
FIG. 10 is a bottom view of the connector of FIG. 4.
Figure 11:
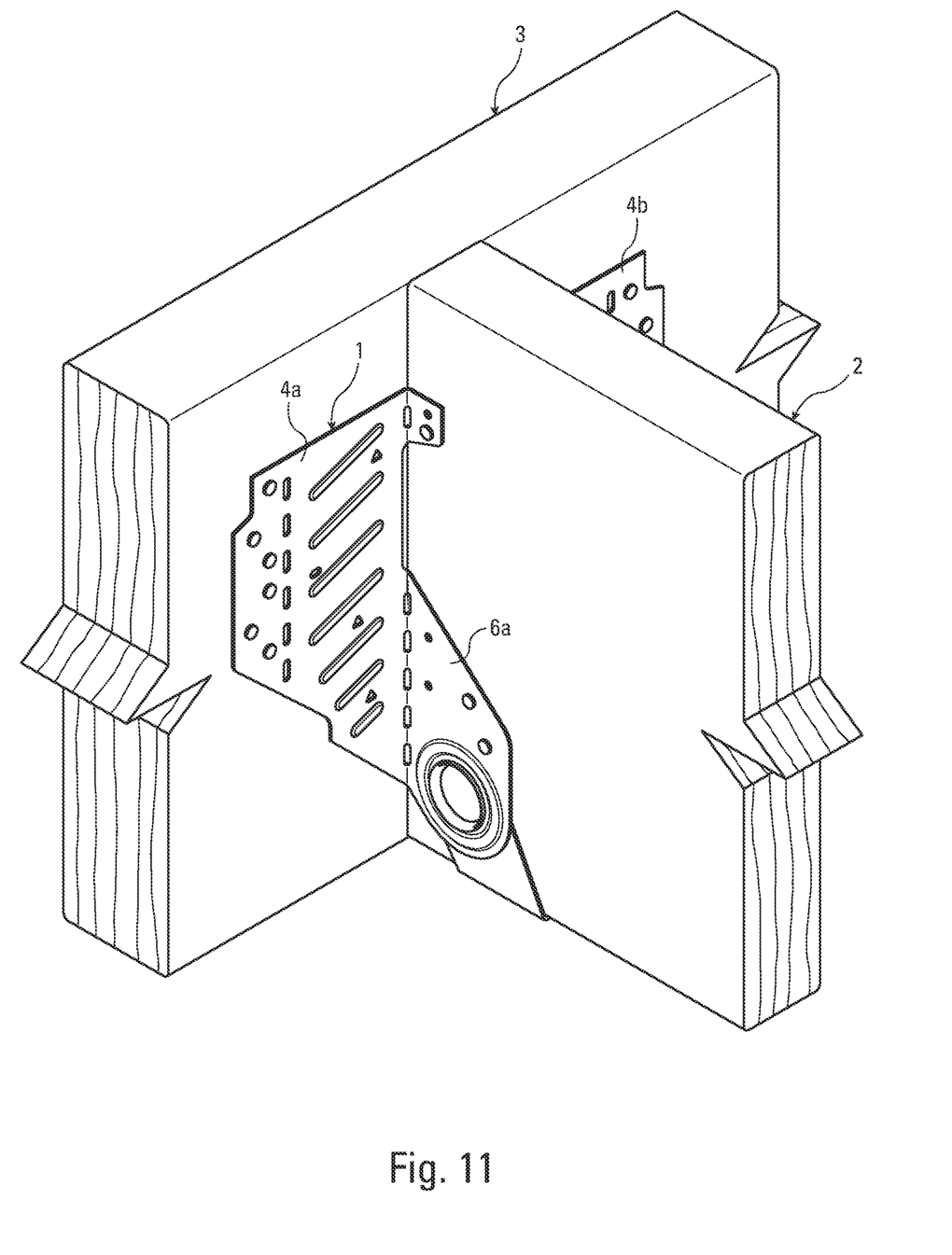
FIG. 11 is a perspective view of the connection of the present invention with the supported member disposed level with the support member.
Figure 12:
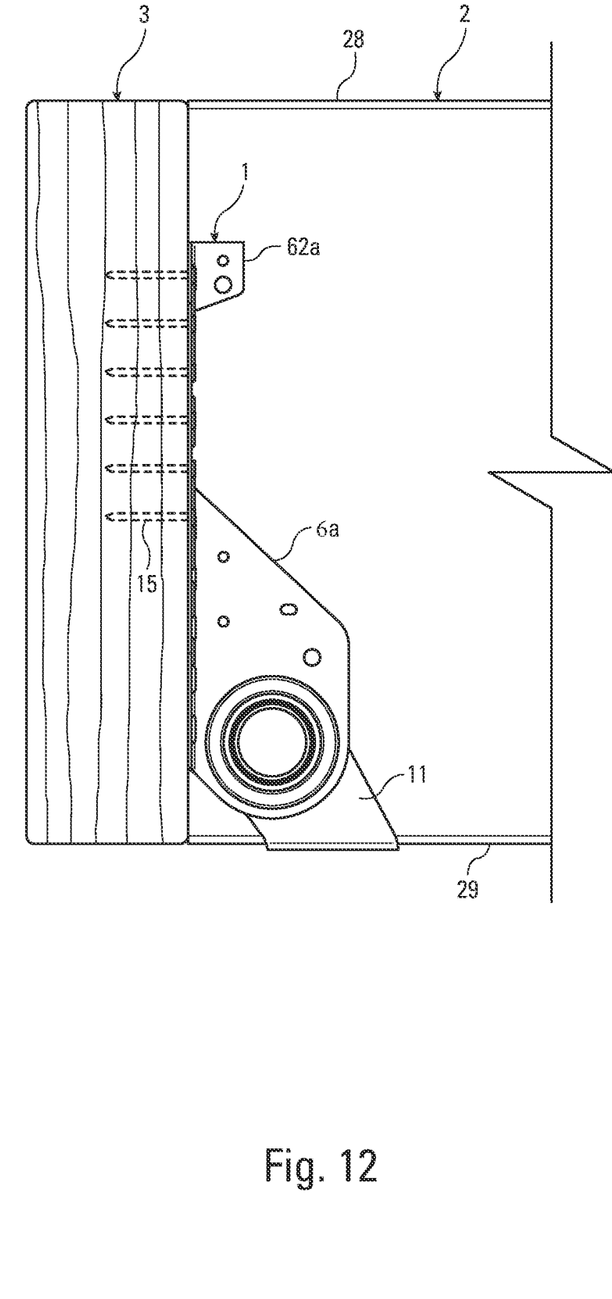
FIG. 12 is a side view of the alternate connection of the present invention shown in FIG. 11

Referring to FIGS. 1 and 5 of the drawings, the connector or hanger 1 of the present invention is designed to attach a supported member 2 to a supporting member 3, with the supported member 2 able to be in sloped and skewed relation to the supporting member 3. The hanger 1 has a pair of back members 4a and 4b. Side support members 6a and 6b are attached to the back members 4a and 4b. A seat member 8 attaches to side support members 6a and 6b at hinges 7a and 7b. The seat 8 has left and right seat bend lines 9 and 10. The preferred embodiment has a pair of left and right seat side members 11 and 12 extending upwardly from the seat member 8 in which the hinges 7a and 7b are formed.

Figure 3:
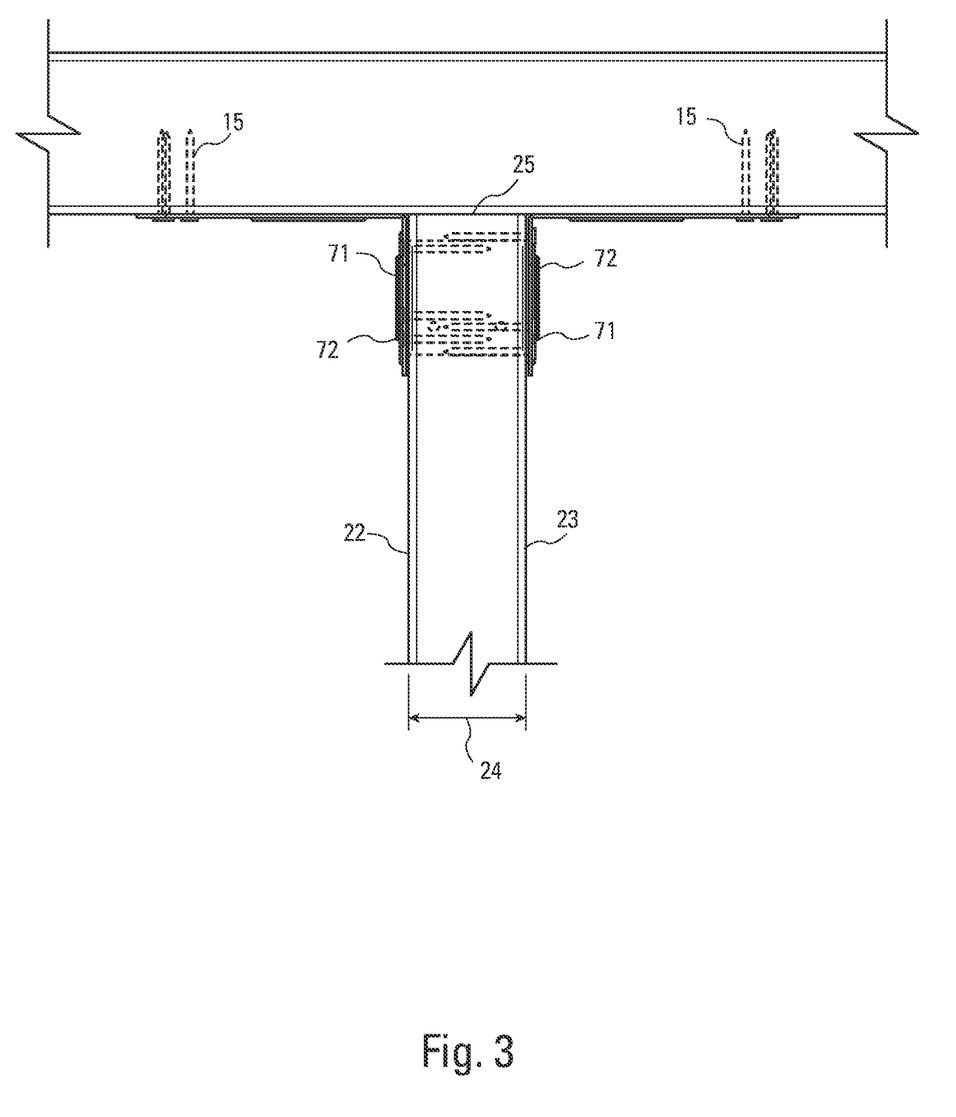
FIG. 3 is a top view of the connection of FIG. 1. The fasteners and the seat of the connector are shown in dotted lines.

Preferably, fasteners 15 are used to attach the connector 1 to the supported and supporting members 2 and 3. As shown in FIG. 3, the fasteners 15 driven through the side members 6a and 6b can be driven at an angle to make connecting in skewed orientations easier. The fasteners 15 shown are nails, but screws and other similar fasteners may be used. The connector 1 is preferably formed with a combination of round or triangular fastener openings 19 and obround or restricted slot fastener openings 20 to aid the user in positioning and driving the fasteners 15 that make the attachment.

Figure 4:
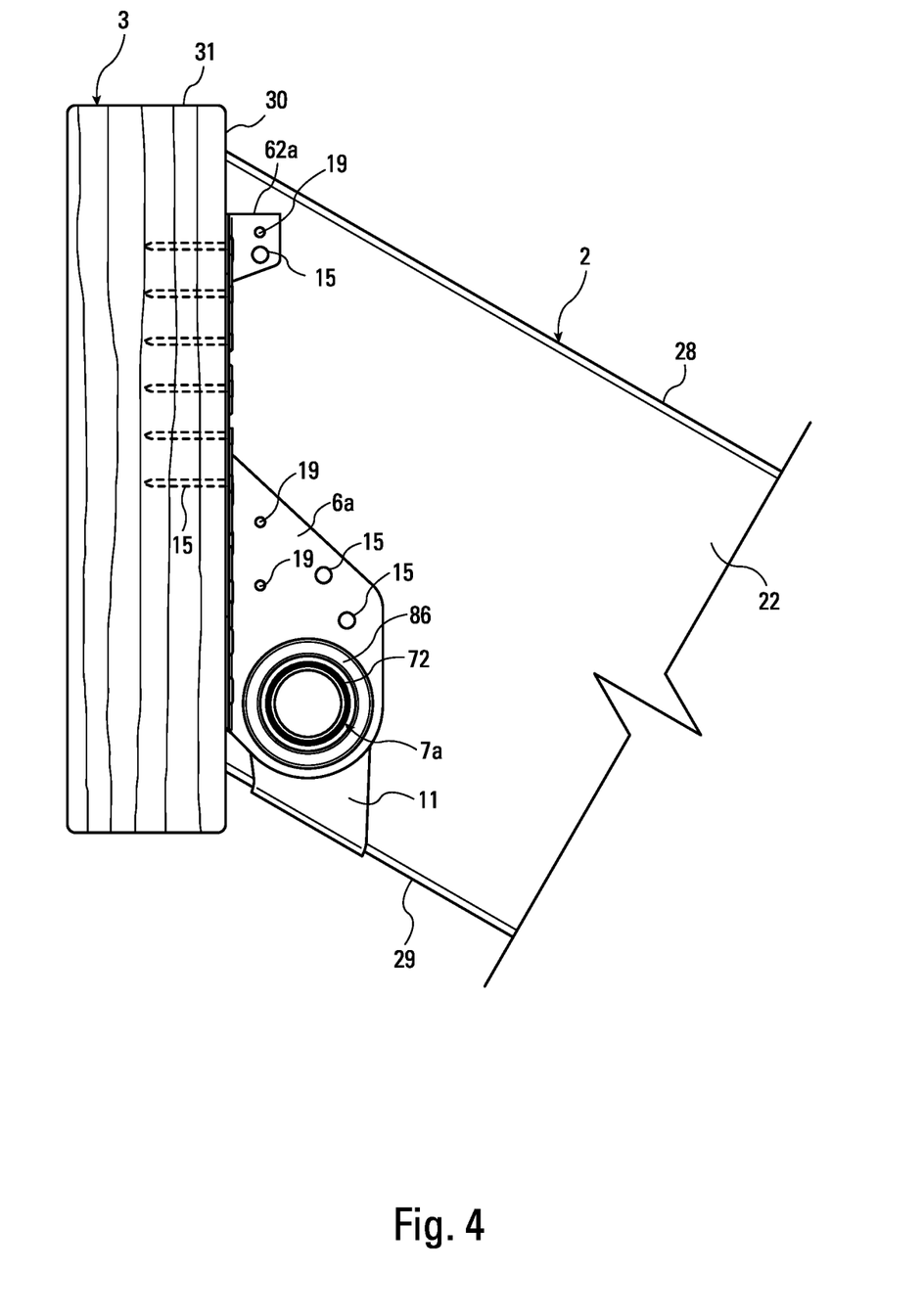
FIG. 4 is a side view of the connection of FIG. 1. Fasteners embedded in the supported and supporting members are shown in dotted lines.

As shown in FIGS. 1 and 3, the supported member 2 is formed with left and right sides 22 and 23 that are generally parallel to each other and are spaced apart a first selected distance 24. The supported member 2 is also formed with an end face 25 that meets with the left and right sides 22 and 23 of the supported member 2 at left and right side edges 26 and 27 of the end face 25. As shown in FIG. 1, the supported member 2 can be formed with a top face 28 and a bottom face 29 that meet with the left and right sides 22 and 23 and the end face 25. As shown in FIG. 4, the top and bottom faces 28 and 29 are generally parallel with each other and can be at a sloped angle to the generally vertically disposed end face 25. A sloping angle is an angle other than 90 degrees. The supporting member 3 has an attachment face 30 and a top face 31 that meets the attachment face 30 at a top edge 32 of the attachment face 30. As shown in FIG. 4, the attachment face 30 is generally vertically disposed and the top face 31 of the supporting member 3 is generally horizontally disposed or it can be sloped as well.

Figure 2:
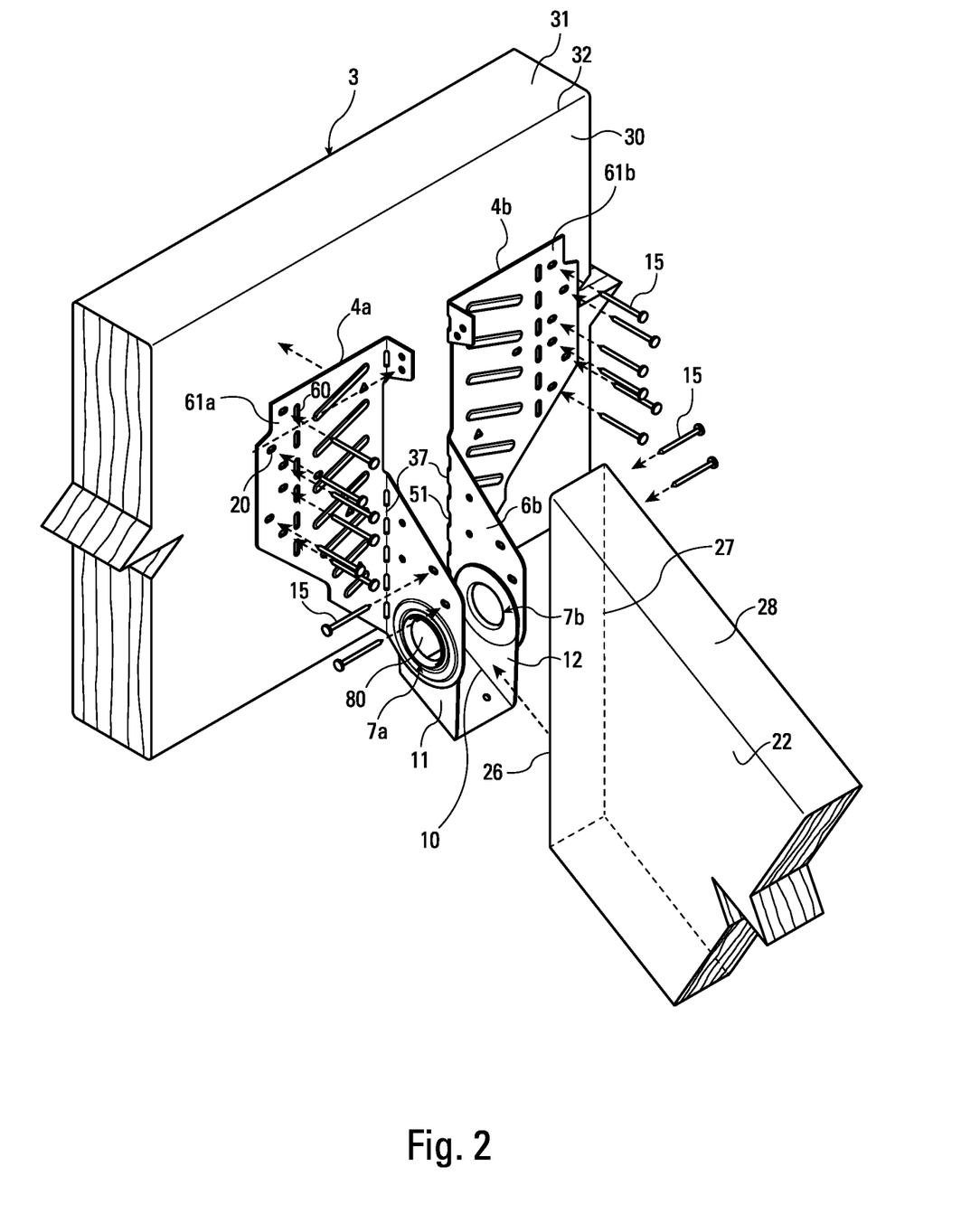
FIG. 2 is an exploded, perspective view of the connection of FIG. 1.

As shown in FIGS. 1 and 2, the connector 1 is formed with back members 4a and 4b. The back members 4a and 4b are substantially planar members that are formed with a vertically disposed column of elongated openings 60 to allow the back members 4a and 4b to be bent by the installer along bend lines that can be formed at the elongated openings 60. The elongated openings in each back member 4a and 4b are disposed between the outer edges of the back members 4a and 4b and where the back members 4a and 4b attach to the side members 6a and 6b. The elongated openings 60 extend in a vertical line during a typical installation as shown in FIG. 1. When the back members 4a and 4b are bent along these bend lines along the elongated openings 60, the outer portions of the back members 4a and 4b between the elongated openings 60 and the outer edges of the back members 4a and 4b are called header flanges 61a and 61b.

In the preferred connection, there is little or no contact between the left and right sides 22 and 23 of the supported member 2 and the back members 4a and 4b, and there is little or no contact between the back members 4a and 4b and the end face 25 of the supported member 2.

The back members 4a and 4b are connected to the seat member 8 only through the side members 6a and 6b.

The seat member 8 is sufficiently strong to hold the supported member 2.

As shown in FIG. 1, the back members 4a and 4b are preferably formed with a series of parallel embossments 33 sloping upwardly towards the supported member 2 from the outer edges of the back members.

The seat member 8 is preferably formed with a rectangular shape to create a bearing surface for the supported member 2.

As shown in FIG. 1, the back members 4a and 4b are attached to the side member 6a and 6b along back bend lines 37. Columns of slotted openings 51 are formed along each of the bend lines 37 to allow the back members 4a and 4b to be more easily bent with respect to the side members 6a and 6b. The embossments 33 in the back members 4a and 4b are provided between the bend lines 37 and the columns of elongated openings 60 in the back members 4a and 4b.

The connector 1 is preferably made from thin sheet steel.

As shown in FIG. 2, left and right seat side members 11 and 12 are preferably integrally connected to opposed sides of the seat member 8 at left and right seat bend lines 9 and 10 and extend generally angularly and upwardly from the seat member 8. The seat side members 11 and 12 preferably interface closely with the left and right sides 22 and 23 of the supported member 2.

The seat member 8 may be set orthogonally from the back members 4a and 4b, or the seat member 8 may be set at a slope.

Openings 19 and 20 for the fasteners 15 can take a variety of shapes and forms. Where fasteners 15 must be driven at an acute angle through the connector 1 into one the supported member 2 or the supporting member 3 it is preferable to form the fastener opening as an obround opening 20. In some skewed installations only the obround openings near the forward edges of the side support member 6a or 6b on the side of the connector set at an acute angle to the support member 3 will be used to attach the connector to the supported member 2. As shown in FIG. 2, these obround openings near the forward edge of the side support members 6a and 6b allow fasteners 15 to be installed when there is little room, allowing a connection to be made with fasteners 15 entering both side support members 6a and 6b and both sides of the supported member 2.

U.S. Pat. No. 4,230,416, granted to Tyrell T. Gilb teaches a restricted slot nail opening 20. In a restricted slot nail opening 20, the opening is a slot-like opening having a length greater than its width. The width of the opening is selected to register with the sides of the fastener 15 that is driven through the opening. The extended length of the opening allows the fastener to be driven at a range of angles through the opening as compared to a circular opening that is close fitting with the shank of the fastener 15. In a closely formed circular opening the fastener 15 must be driven generally orthogonally to the face of the connector 1, although generally some play is allowed and the fastener can be driven with some varying degree in its orientation. As the side support members 6a and 6b can be bent at a variety of angles to the attachment face 30 of the supporting member 3, the fasteners 15 can be driven at a variety of angles to the supporting member 3.

Bending of the side member 6a and 6b with respect to the back members 4 and 4b is facilitated by the provision of slots 51 which are aligned with one another along the longitudinally extending bend line 37 between the back member 4 and the side member 6.

Figure 13:
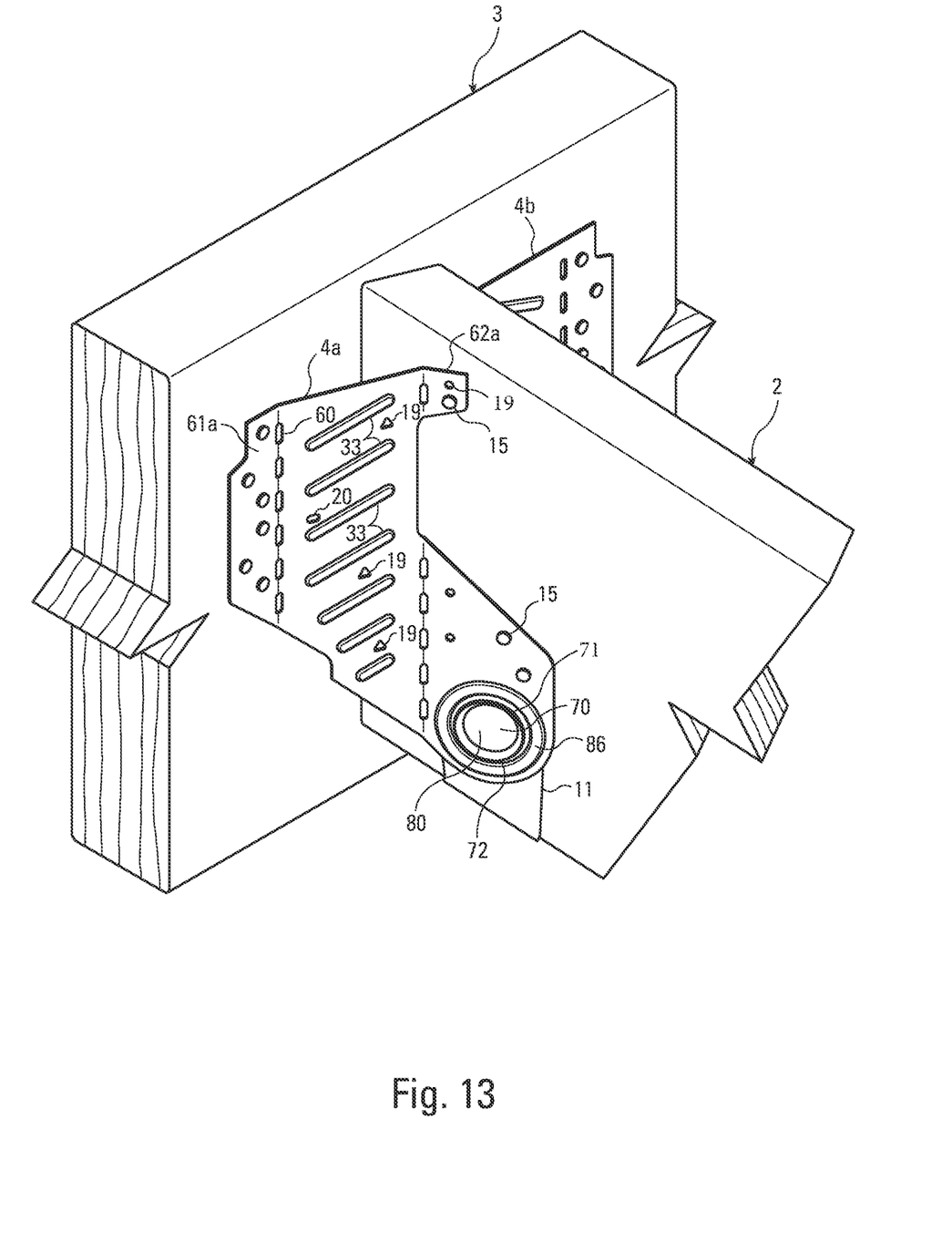
FIG. 13 is a perspective view of a sloped and skewed connection of the present invention.
Figure 14:
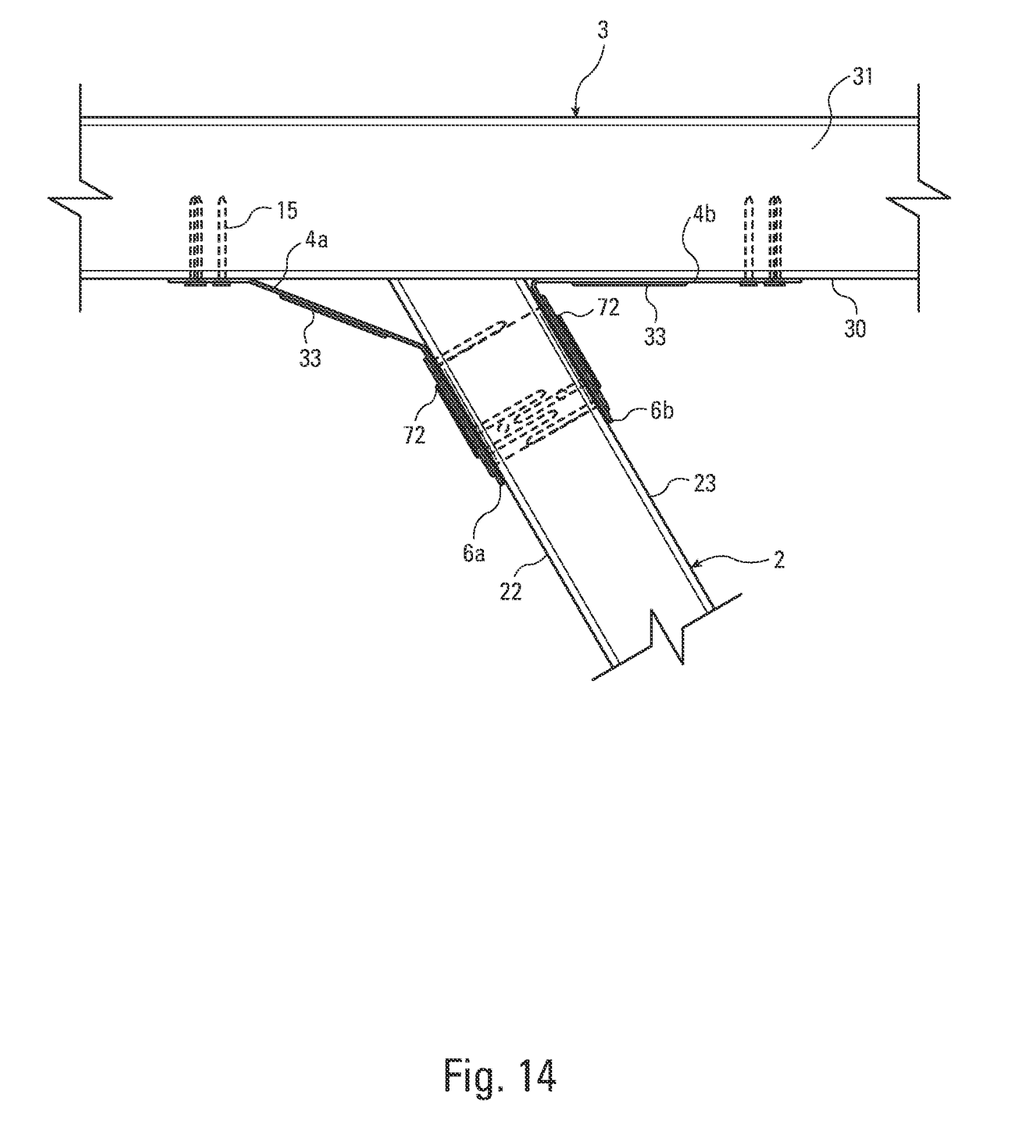
FIG. 14 is a top view of the connection of FIG. 13.
Figure 15:
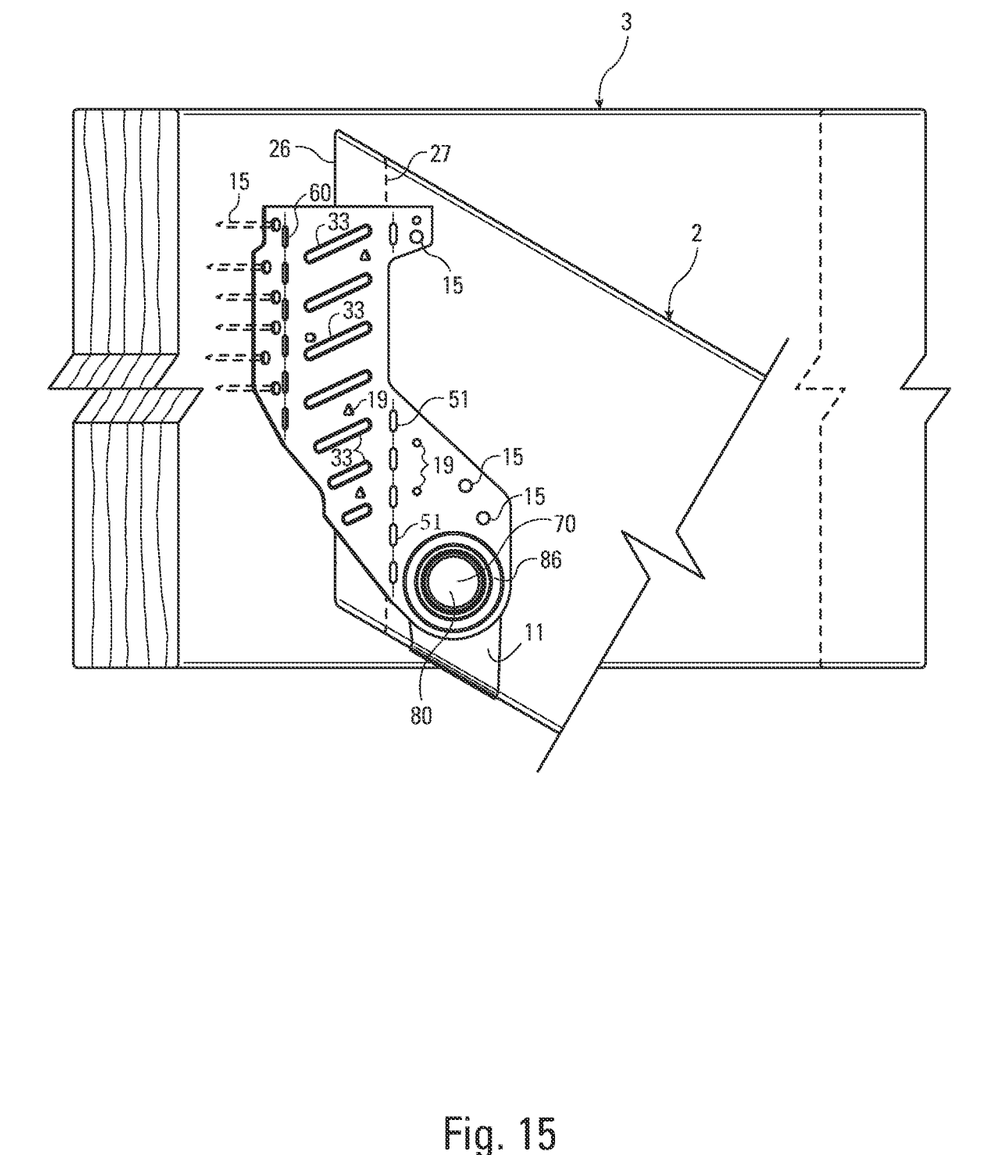
FIG. 15 is a side view of the connection of FIG. 13.

FIGS. 13-15 illustrate the connector 1 skewed to the right with the acute side of the connection on the right side of FIG. 14 and the obtuse side of the connection on the left side of FIG. 14.

The retrofit connection, when the supported member 2 is already attached to the supporting member 3, is formed by inserting the connector 1 of the present invention underneath the supported member 2. The seat member 8 engages the bottom face 29 of the joist or supported member 2 and seat fasteners 15 are used to attach the seat to the supported member 2. If the connection is skewed as shown in FIGS. 13-15, before the connector 1 is put in place, the back member 6b is field bent forward at bend line 37 to engage the attachment face 30 of the supporting member 3. The hanger 1 is then put in place and fasteners 15 are driven through the back member 4b and the side member 6b through the obround openings 21 near the outer edge of the back member 4b and the forward edge of the side support member 4b to make the connection. The back member 4a is then bent back from the side support member 6a along bend line 37 and fasteners 15 are driven through the side support member 6a into the supported member 2. The back member 4a is then bent along the column of elongated openings creating the header flange 61 a that can interface with the attach surface of the supporting member 3. Fasteners 15 are then driven through the header flange 61 into the support member 3.

The connector 1 is preferably formed with attachment tabs 62a and 62b that extend from bend lines 37 above the side support members 4a and 4b. These attachment tabs make an additional connection to the upper portion of the supported member 2.

As shown in FIGS. 2, 4 and 5, the hinges 7a and 7b that connect the seat to the side members and allow the seat to pivot with respect to side members can be formed in the following manner. The seat side members 11 and 12 extend generally parallel to side support members 6a and 6b. The seat side members 11 and 12 are formed with circular openings 70 and side support members 6a and 6b are formed with corresponding circular openings 80. Preferably, the circular openings 70 are at least partially provided with one or more arcuate or annular flanges 71 which project outwardly toward the side support members 6a and 6b. If the entire opening is not circumscribed then at least a pair of opposed portions of the corresponding circular opening 70 are provided with one or more arcuate flanges 71. More preferably three or more portions of the circular opening 70 at intervals around the perimeter of the corresponding circular opening 70 are provided with one or more arculate flanges 71. Most preferably the entire opening 70 is provided with one continuous annular flange 71. To form the hinge 7a and 7b and join the members together, the annular flange of the circular opening 70 is inserted through the circular opening 80. The upper portion 72 of the annular flange 71 is then deformed to bend over an edge of circular opening 80. The bent upper portion 72 of the annular flange 71 extends radially outwardly and overlies the side support members 6a and 6b, connecting the members together. The annular flange 71 has been described, according the preferred embodiment as projecting outwardly from the seat member 8. This arrangement of the members is preferred, but the annular flange 71 could be formed on the side support members 6a and 6b project toward the seat member 8.

As shown in FIGS. 1 and 3, the side support members 6a and 6b are formed with one or more embossments 86 with the one or more embossments 86 circumscribing or partially circumscribing the openings 80 in the side support members 6a and 6b. Preferably the embossments 86 are a single, continuous member that completely circumscribes the openings 80. The embossment 86 preferably projects away from the supported member 2.

We claim:
1. A connection between a supported member and a supporting member, the connection comprising:
  a. the supported member having left and right sides that are generally parallel to each other and are spaced apart a first selected distance, the supported member also having an end face that meets with the left and right sides of the supported member at left and right side edges of the end face, the supported member also having a top face and a bottom face that meet with the left and right sides and the end face;
  b. the supporting member having an attachment face with the end face of the supported member being in close proximity to the attachment face such that the end face of the supported member abuts with the attachment face of the supporting member, or one of the left and right side edges of the end face is in close proximity to the attachment face of the supporting member;
  c. a connector, the connector having back members, portions of which interface with the attachment face of the supporting member, the back members being connected to side members which are connected to a generally planar seat member, each of the back members having an outer edge disposed away from where the back member connects to the side member, each of the back members being formed with a series of parallel embossments with the parallel embossments of each back member slanting upwardly from the outer edge of the back member toward the top surface of the supported member, and the seat member interfaces with the bottom face of the supported member; the side members contact the sides of the supported member, and
  d. fasteners are driven through the side members and into the supported member, and fasteners are driven through the back members and into the supporting member.

2. The connection of claim 1, wherein:
the seat member is connected to the side members by a hinge.

3. The connection of claim 2, wherein:
the side members and the back members are formed with obround fastener openings that allow fasteners to be driven at various angles through the same opening.

4. The connection of claim 1, wherein:
left and right seat side members extend upwardly from the seat member and interface with the left and right sides of the supported member.

5. The connection of claim 1, wherein:
  a. the attachment face of the supporting member is generally vertically disposed;
  b. the end face of the supported member is disposed generally vertically; and
  c. the bottom face of the supported member is disposed at an angle different from 90 degrees to the end face of the supported member.

6. The connection of claim 1, wherein:
a fastener is driven through the seat member and into the bottom face of the supported member.

7. The connection of claim 1, wherein:
the back members are each formed with a column of elongated openings.

8. The connection of claim 7, wherein:
the connector is formed with a column of slotted openings between each back member and the corresponding side member to which it is attached.

9. The connection of claim 8, wherein:
the series of parallel embossments formed in the back members are formed between the column of elongated openings and the column of slotted openings.

10. The connection of claim 1, wherein:
the connector is formed with attachment tabs that extend from the back members and connect to the left and right sides of the supported member.

\* \* \* \* \*